(12) United States Patent
Co et al.

(10) Patent No.: US 6,240,101 B1
(45) Date of Patent: May 29, 2001

(54) BI-DIRECTIONAL DAISY-CHAIN CASCADING OF NETWORK REPEATERS

(75) Inventors: Ramon S. Co, Trabuco Canyon; Daniel Hsu, Fountain Valley, both of CA (US)

(73) Assignee: Kingston Technology Co., Fountain Valley, CA (US)

( * ) Notice: Subject to any disclaimer, the term of this patent is extended or adjusted under 35 U.S.C. 154(b) by 0 days.

(21) Appl. No.: 09/082,002

(22) Filed: May 20, 1998

(51) Int. Cl.$^7$ .................................................. H04L 25/20
(52) U.S. Cl. ........................ 370/461; 370/438; 370/445; 370/501
(58) Field of Search .................................. 370/402, 438, 370/445, 461, 492, 501

(56) References Cited

U.S. PATENT DOCUMENTS

| | | | |
|---|---|---|---|
| 5,636,214 | * | 6/1997 | Kranzler et al. ..................... 370/438 |
| 5,648,959 | * | 7/1997 | Ilyadis et al. ........................ 370/445 |
| 5,740,174 | * | 4/1998 | Somer ................................... 370/402 |
| 5,805,596 | * | 9/1998 | Kranzler et al. ..................... 370/445 |
| 6,041,061 | * | 3/2000 | Su ......................................... 370/461 |
| 6,097,705 | * | 8/2000 | Ben-Michael et al. .............. 370/315 |

* cited by examiner

Primary Examiner—Hassan Kizou
Assistant Examiner—Joseph Logsdon
(74) Attorney, Agent, or Firm—Stuart T. Auvinen (57) ABSTRACT

Each stacked repeater has two activity ports that are daisy chained to the activity ports of other repeaters in the stack. Each activity port has an input and an output. The two activity ports connect to the next repeater above and the next repeater below in the stack. Each repeater examines its local network ports to computer stations such as PC's to determine if any are inputting data to the repeater. When any local port is inputting data, the repeater activates both of its activity-port outputs. When no local port is inputting data, the repeater simply passes each activity-port's input through to the other activity-port's output. Thus the activity-port output indicates when either the repeater or an earlier repeater in the chain has a local port inputting data. Port activity is chained in two directions: through all repeaters in the stack from the top-most repeater, down the stack to the bottom-most repeater, and also from the bottom-most repeater, up through the repeaters to the top-most repeater. Thus one activity-port's input indicates when any of the repeaters above have a local port inputting data, while the other activity-port's input indicates when any of the repeaters below have a local port inputting data. The one-port-left state is determined by any repeater using the two activity ports.

17 Claims, 10 Drawing Sheets

S1 BACKS OFF FIRST

BI-DIRECTIONAL DAISY-CHAIN CASCADING OF NETWORK REPEATERS

FIELD OF THE INVENTION

This invention relates to computer networks, and more particularly to cascading of repeaters in a network.

BACKGROUND OF THE INVENTION

Drastic price reductions of personal computers (PC's) have allowed large and small organizations to give computers to more office workers. An expansion of business often requires that more computers be installed and connected to existing computers and servers. Distribution of tasks among office workers often requires that these computers be linked together on a network.

Local-area networks (LAN's) connect computers in an office complex together. These LAN's are often connected to other LAN's or the Internet. As more computers are installed, the number of connections or ports on the LAN needs to increase. Additional networking equipment must be installed to make the additional ports available.

Repeaters are commonly used to increase the number of ports on a LAN. A repeater typically has four, eight, or sixteen ports. Any transmission to any of the ports is repeated to all the other ports on the repeater. Thus all the ports see transmissions from any of the repeater ports.

Figure 1:
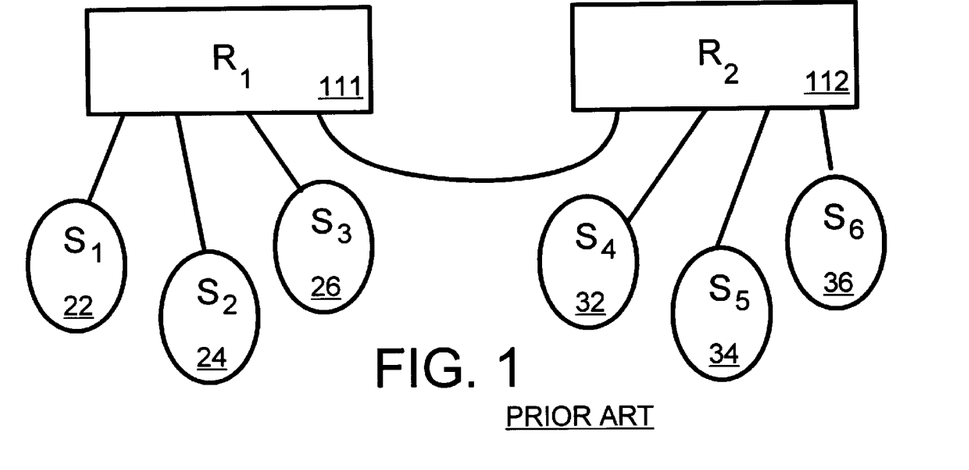
FIG. 1 illustrates cascading of repeaters to increase the number of available ports on a LAN.

As more computers are purchased and installed, additional ports are needed to connect the new computers to the network. Eventually, all of the ports on the repeater are used, so additional repeaters must be installed. FIG. 1 illustrates cascading of repeaters to increase the number of available ports on a LAN. Repeaters 111, 112 each have four connections or ports. Stations 22, 24, 26 on repeater 111, and stations 32, 34, 36 on repeater 112, are client computers such as PC's, or server machines.

The fourth port on repeater 111 is connected to the first port of repeater 112 by a cable. Any transmission from stations 22, 24, 26 are repeated both to the other stations on repeater 111, and through the cable to repeater 112. Repeater 112 then repeats the transmission to its stations 32, 34, 36. The reverse is also true: a transmission from station 36 is repeated by repeater 12 to stations 32, 34, but is also repeated to stations 22 24, 26 by repeater 111. Thus any transmission from any of the six stations is repeated to the other five stations by the two cascaded repeaters 111, 112.

As additional PC's are installed, a third repeater could be cascaded by moving station 36 to the third repeater, and connecting the fourth port of repeater 112 to one of the ports of the third repeater. Thus additional repeaters can be cascaded to existing repeaters to expand the network. Such cascading is sometimes referred to as chaining or daisy-chaining.

There are physical limits to the number of repeaters that can be cascaded together. Delays within the repeaters and from the cables limit the number of repeaters that can be cascaded together. In the 10 Mbps network, this limit is four repeaters, but in the 100 Mbps network, the limit is just two repeaters. Cascading repeaters is somewhat inefficient since one or two ports on each repeater are used for cascading rather than for connecting computers (stations). In the example of FIG. 1, only six of the eight ports are used for connecting computer stations.

Figure 2:
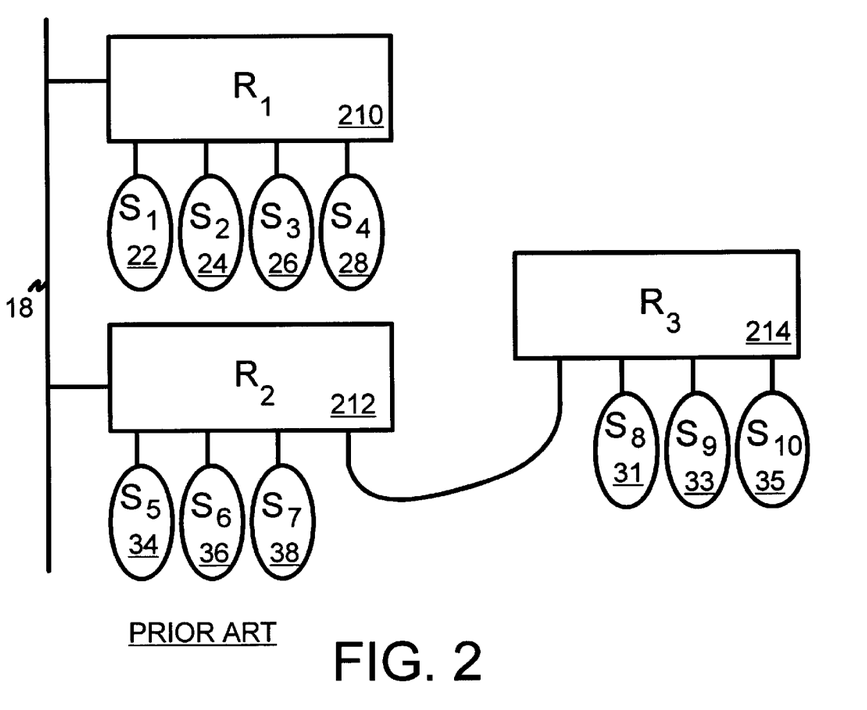
FIG. 2 shows stacking and cascading of repeaters.

More efficient networks can be constructed by stacking rather than cascading repeaters. FIG. 2 shows stacking and cascading of repeaters. A proprietary backplane bus is used to connect repeaters 210, 212 together using a stacking connector. Stacking bus 18 contains the data and control signals required for the operation of repeaters 10, 12 as one logical repeater unit. Stacked repeaters 210, 212 are grouped together as one repeater unit for determining the maximum cascaded-repeater limit.

Since a separate stacking connector couples repeaters 210, 212 to stacking bus 18, all of the four ports are available for connecting to computer stations. Repeater 210 connects to four stations 22, 24, 26, 28, while repeater 212 connects to three stations 34, 36, 38. The fourth port of repeater 212 is used to cascade to repeater 214 using the technique of FIG. 1. Repeater 214 connects to three more stations 31, 33, 35.

Repeaters 210, 212 are stacked together while repeaters 212, 214 are cascaded. Repeater 214 could be cascaded with two more repeaters since repeater 210 is stacked rather than cascaded. Stacked repeaters are grouped together as one repeater unit when determining the limit of repeaters that can be cascaded together. Thus stacking allows for more ports than simple cascading.

Figure 3:
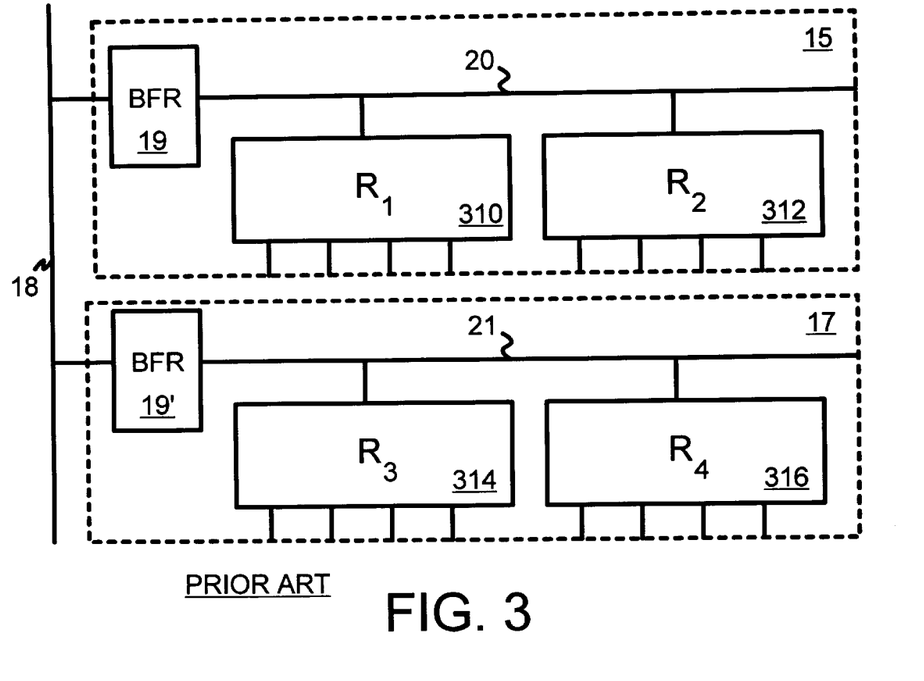
FIG. 3 highlights that stacking can occur internally and externally.

FIG. 3 highlights that stacking can occur internally and externally. Repeaters 310, 312 have stacking connections to internal stacking bus 20, while repeaters 314, 316 have stacking connections to internal stacking bus 21. Buffers 19, 19' buffer signals from internal stacking busses 20, 21 to external stacking bus 18. Thus busses 20, 21, 18 connect repeaters 310, 312, 314, 316 together, allowing sixteen computer stations to be connected to the four repeaters.

Repeaters 310, 312 are each separate integrated circuit (IC) chips on repeater board or card 15, while repeaters 314, 316 are IC chips on card 17. External bus 18 is a backplane bus that connects separate repeater cards together on a chassis. Thus 8-port repeater cards can be constructed from four-port repeater chips. Of course, other sizes are possible.

Collisions, Jamming, One-Port-Left

Collisions are error conditions that occur when two or more computer stations simultaneously transmit. When a repeater detects that two of its ports are simultaneously receiving data, it activates a collision signal and transmits a jamming sequence to all ports to prevent another station from beginning transmission. The jamming sequence collides with the data transmitted by the stations. The stations sense a collision by the simultaneous transmit and receive sequences and abort transmission.

Once all stations have stopped transmitting, the repeaters stop sending the jamming sequence. The colliding stations each wait a predetermined amount of time (the backoff period) and then retransmit. The retransmission time is randomly determined for each station.

For a chain of cascaded repeaters, any collision first occurs at a specific point in the chain. The repeater that first detects the collision is the first to generate the jamming sequence. Eventually all repeaters in the chain generate the jamming sequence. Each repeater continues to generate the jamming sequence until exactly one port is inputting data. The repeater that enters the one-port-left state stops jamming the remaining port that is inputting data, but continues to jam the other local ports. When input activity on the remaining port ceases, the repeater stops jamming the other ports.

All repeaters in the chain sequentially enter the one-port-left state once the station causing the collision backs off. The repeaters then exit the one-port-left state in the reverse order.

Detecting One-Port-Left for Stacked Repeaters

When repeaters are stacked together, they must act as one unit. The one-port-left state must be determined for all the stacked repeaters together as if they were all one repeater.

The stacking bus contains signals to quickly detect the one-port-left state for the stacked repeaters. The delay to detect one-port-left must be minimized.

Figure 4:
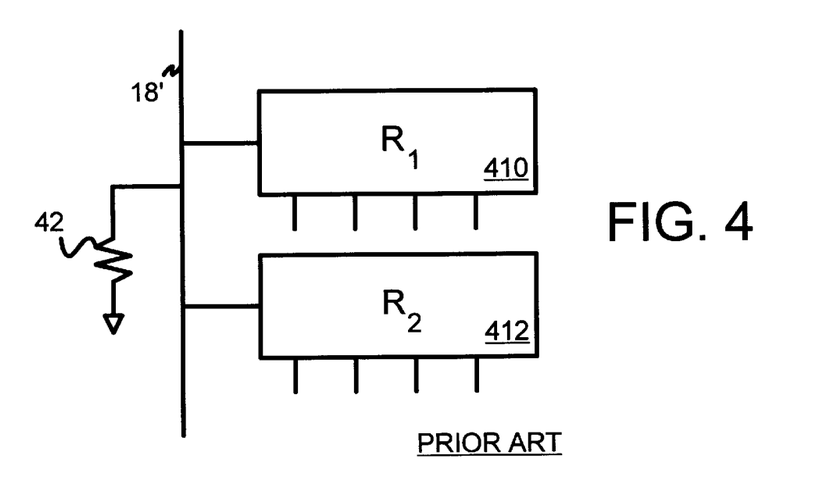
FIG. 4 shows an analog solution to detect the one-port-left state of a group of stacked repeaters.

FIG. 4 shows an analog solution to detect the one-port-left state of a group of stacked repeaters. The stacking bus includes activity line 18' that is pulled low by resistor 42. When either repeater 410, 412 receives data or a jam signal on one or more of its ports, it pulls activity line 18' high. The voltage on activity line 18' is determined by the amount of current through resistor 42. When only one of repeaters 410, 412 drives activity line 18', then its voltage is I*R where I is the current driven from each repeater to activity line 18'. When both repeaters 410, 412 drive activity line 18', then its voltage is higher: 2*I*R.

Repeaters 410, 412, or other logic can sense the voltage of activity line 18', and when the voltage falls to I*R, then only one of the stacked repeaters has an active input port. Thus the stacked repeaters, as a unit, have only one port left.

While such analog sensing for one-port left is useful, noise coupling into the activity line is problematic. Precise resistors and sensing circuits are needed. Also, there can be only one resistor for the activity line for the entire stack. This is undesirable, since all the repeaters in the stack are no longer identical. One must have the resistor while others don't. A DIP switch or configuration of the resistors by auto-sensing at startup can be employed. Unfortunately, this complicates installation of additional repeaters in the stack.

Figure 5:
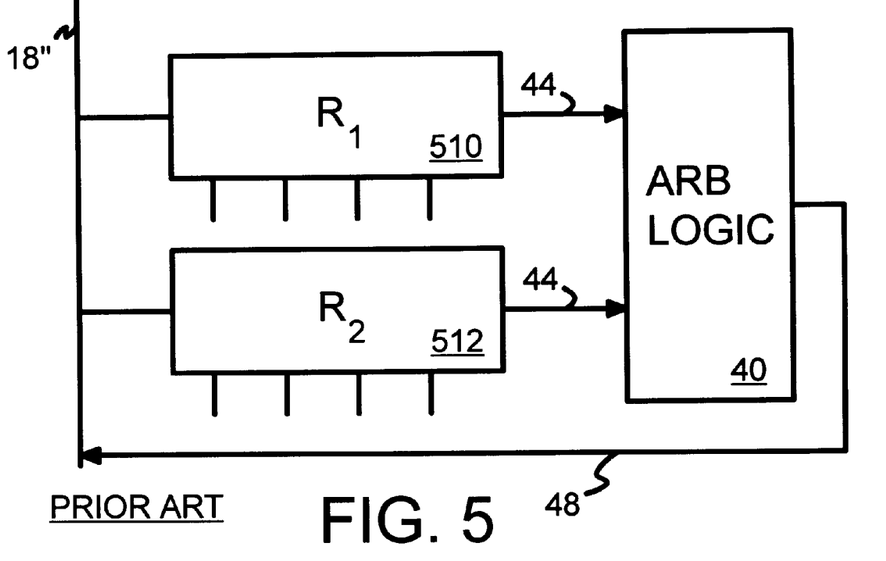
FIG. 5 illustrates a digital solution to detect one-port-left for stacked repeaters.

FIG. 5 illustrates a digital solution to detect one-port-left for stacked repeaters. Arbitration logic 40 receives activity or request lines 44 from each repeater 510, 512 that is stacked together on stacking bus 18". Arbitration logic 40 counts the number of request lines 44 that are active, and waits until just one of request lines 44 are active, indicating that only one repeater has a port inputting data. Then arbitration logic 40 signals on line 48 the one-port-left state. It can also signal on line 48 that an inter-repeater collision has occurred, signaling to repeaters 510, 512 to start generating the jamming sequence.

While arbitration logic 40 may be integrated with repeaters 510, 512, it is not as flexible as the analog solution of FIG. 4. As more repeaters are added to the stack, additional request lines must be input to arbitration logic 40 from each of the added repeaters. Arbitration logic 40 has a number of request-line inputs that is fixed at manufacture. The number of request lines can be limited by the number of pins on the IC containing arbitration logic 40, such as a programmable-logic device or a higher-integration IC that includes repeaters 510, 512. The unused request lines can increase the cost of the stack, by requiring a larger IC package and by requiring additional wires in cables that connect together repeaters in the stack to arbitration logic 40. Multiple levels of arbitration can be used but adds to the cost and complexity. Thus the number of repeaters that can be stacked together is limited to the number of request-line inputs to arbitration logic 40.

What is desired is an easily expandable stack of repeaters. It is desired to detect the one-port-left state in a stack of repeaters. It is desired to use digital rather than analog signals for detecting the one-port-left state to reduce noise sensitivity. It is further desired to allow any number of repeaters to be added to the stack by not limiting the inputs to one-port-left detection logic. It is desired to have expandable one-port-left logic that is distributed among repeaters rather than in a central location so that the repeater units are all identical.

SUMMARY OF THE INVENTION

A stackable repeater for use in a stack of repeaters has local ports. Each local port connects to a local station on a network or cascades to a repeater that is not stacked with the stackable repeater.

An upper activity port connects to a next-higher stackable repeater in the stack. The upper activity port has an upper input receiving an upper-activity input signal from the next-higher stackable repeater. The upper activity port also has an upper output that outputs an upper-activity output signal to the next-higher stackable repeater.

A lower activity port connects to a next-lower stackable repeater in the stack. The lower activity port has a lower input that receives a lower-activity input signal from the next-lower stackable repeater. The lower activity port also has a lower output that outputs a lower-activity output signal to the next-lower stackable repeater.

The upper-activity input signal indicates when any higher repeater above the stackable repeater in the stack has a local port that is inputting data to the higher repeater. The lower-activity input signal indicates when any lower repeater below the stackable repeater in the stack has a local port that is inputting data to the lower repeater.

Thus local-port activity of the higher repeaters in the stack is sent to the stackable repeater through the upper activity port and local-port activity of the lower repeaters in the stack is sent to the stackable repeater through the lower activity port.

In further aspects of the invention the lower-activity output signal indicates when any higher repeater above the stackable repeater in the stack has a local port that is inputting data to the higher repeater or when any local port of the stackable repeater is inputting data to the stackable repeater. The upper-activity output signal indicates when any lower repeater below the stackable repeater in the stack has a local port that is inputting data to the lower repeater or when any local port of the stackable repeater is inputting data to the stackable repeater, Thus local-port activity of the stackable repeater is OR'ed with the upper-activity input signal to generates the lower-activity output signal. The local-port activity of the stackable repeater is OR'ed with the lower-activity input signal to generate the upper-activity output signal.

DETAILED DESCRIPTION

The present invention relates to an improvement in network repeaters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a daisy-chain scheme can be used to detect the one-port-left state of a stack of repeaters. Activity information of the ports of a repeater can be cascaded together within the stack to other repeaters in the stack. Rather than just a single daisy chain, two daisy chains are used to send activity information in both directions of the chain of repeaters in the stack. Activity information is passed bi-directionally through the chain of repeaters in the stack. As more repeaters are added, they are simply inserted into the chain or to the end of the chain. Thus expansion is facilitated.

Each repeater in the chain examines its inputs and determines a local one-port-left state for itself. Then the local one-port-left state is merged with the inputs and passed to the next repeaters in the chain, both to an upstream repeater and to a downstream repeater. One daisy-chain input indicates if there is any activity to one side of the repeater, while the other daisy-chain input indicates activity to the other side.

Figure 6:
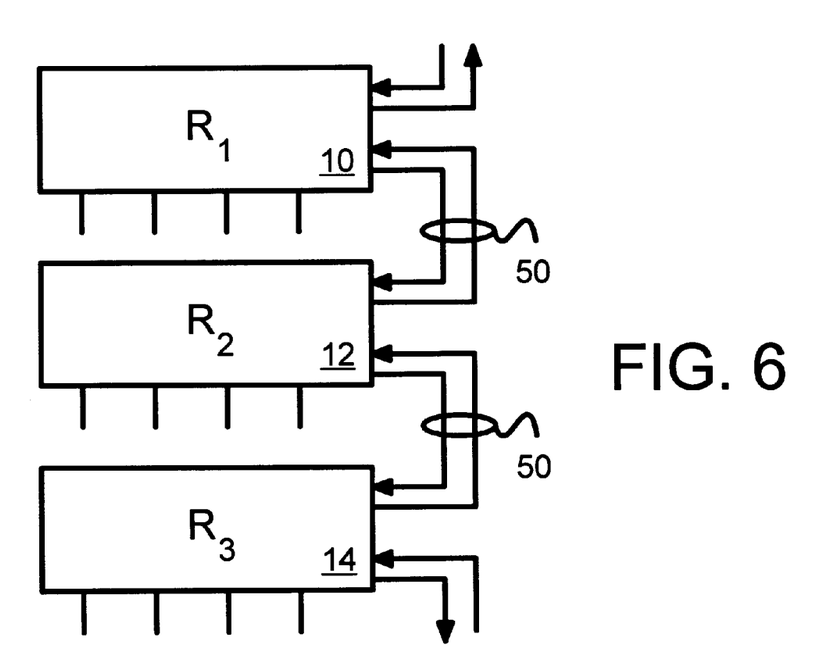
FIG. 6 highlights a bi-directional daisy chain of activities for repeaters in a stackable hub.

FIG. 6 highlights a bi-directional daisy chain of activities for a group of stackable repeaters. Repeaters 10, 12, 14 are stacked together to form a single logical unit. Each repeater 10, 12, 14 can connect to as many as four computer stations such as PC's and servers, since each has four ports. One of the ports many be connected to another repeater as shown in FIG. 2 for standard cascading.

Activity lines 50 form a bi-directional daisy chain. When any of the lower repeaters in a stack has a port that is inputting data or a jam, an activity is signaled by asserting the activity line connected upward to higher repeaters in the stack. For example, when repeater 14 has an active input port, it activates it's activity line to repeater 12. Repeater 12 does not have any active ports, but passes the activity signal generated by repeater 14 to the next higher repeater in the stack, repeater 10. Likewise, activity from repeater 10 (or a higher repeater in the stack), is signaled by activating activity lines 50 to repeater 12. Repeater 12 then passes the activity signal down to repeater 14.

When port activity is detected on repeater 12, it generates the activity signal on the upward line to repeater 10, but also generates an activity signal on the downward line to repeater 14. Thus detected activity is signaled by passing signals in an upward and in a downward direction through the stack of repeaters. Other repeaters can be added to the stack, above repeater 10, or below repeater 14, simply by connecting to activity lines 50.

Figure 7:
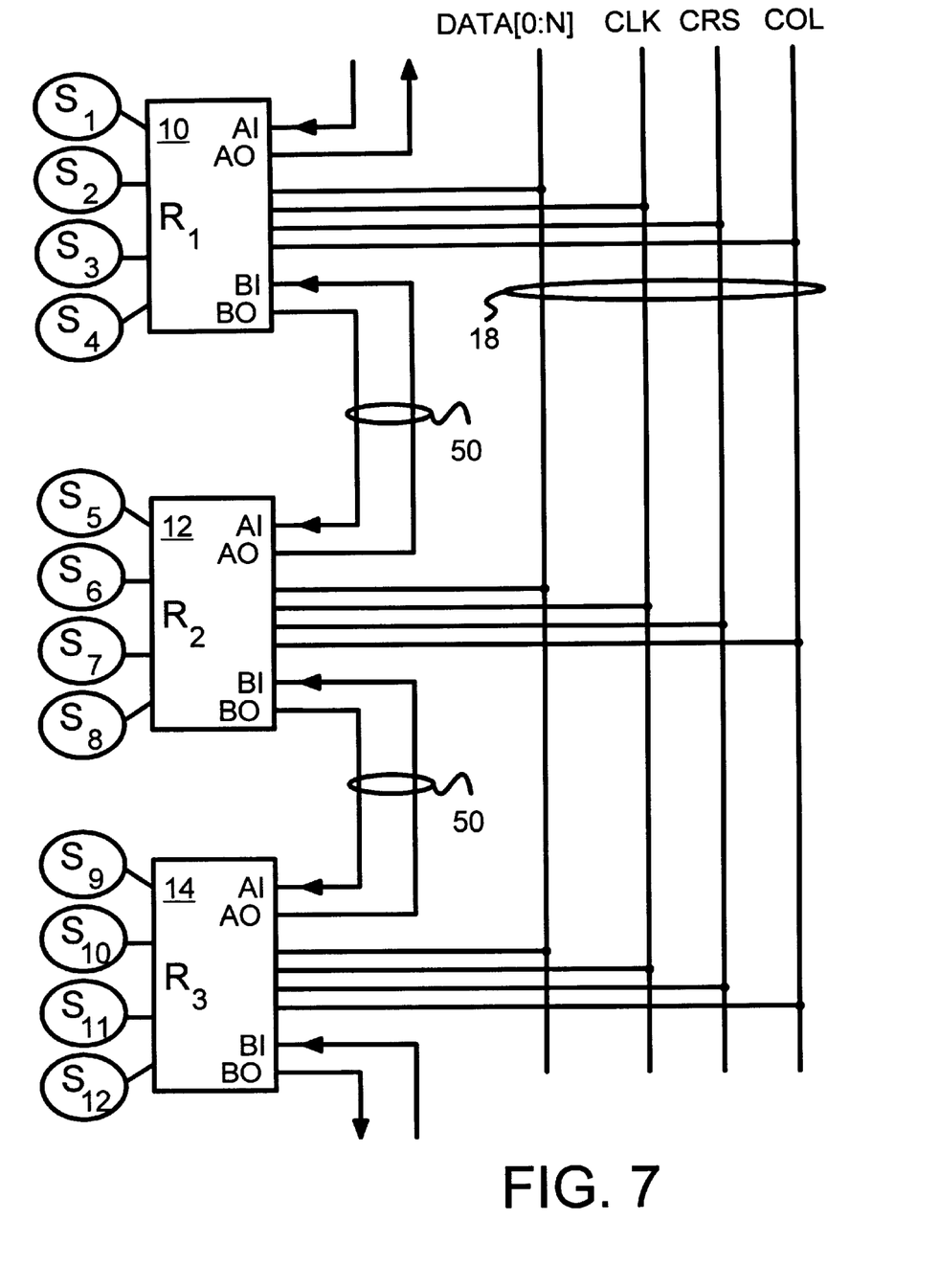
FIG. 7 is a diagram of a stack of repeaters with a bi-directional daisy chain of activity signals to detect the one-port-left state.

Bi-Directional Activity Lines—FIG. 7

FIG. 7 is a diagram of a stack of repeaters with a bi-directional daisy chain of activity signals to detect the one-port-left state. Repeater 10 has ports to computer stations 1, 2, 3, 4, while repeater 12 connects to stations 5, 6, 7, 8 and repeater 14 connects to four more stations. Repeaters 10, 12, 14 are stacked together and can be cascaded with other repeaters in the normal fashion. Repeaters 10, 12, 14 act as a single repeater unit when so cascaded.

Stacking bus 18 connects to stacking ports of all repeaters 10, 12, 14 in the stack. Stacking bus 18 includes data lines DATA[0:N], which is a single bit for the 10 Mbps 10BaseT standard but 4 bits for the 100 MBps 100BaseT Ethernet Standard. The data is clocked by clock line CLK on stacking bus 18. CLK operates at 10 MHz for 10BaseT, but 25 MHz for 100BaseT. When any of repeaters 10, 12, 14 receive data or a jam sequence on any of their inputs, the data or jam sequence is copied to the data lines on stacking bus 18 and to the other input ports of repeater 10, 12, 14.

The data is grouped into larger frames of data. Signal CRS is the carrier signal. Collision signal COL is activated when one of repeaters 10, 12, 14 detects a collision. A collision can occur between local ports of each repeater or between stackable repeaters through activity lines 50.

Activity lines 50 connect activity ports A and B on repeaters 10, 12, 14. The A activity ports are on the upper side (location or position) of the repeaters, while the B activity port is on the lower side of the repeaters. Repeater 12 sends activity upward from it's A activity output (AO) to the B input (BI) of repeater 10 above. Repeater 10 sends activity for itself and any other repeaters above it (not shown) from its B activity output (BO) to repeater 12's A activity input (AI). Repeater 12 then passes it's A input (AI) to its B output (BO) to repeater 14. Any activity on any of repeater 12's ports causes both of its activity outputs (AO and BO) to be active if they are not already. Otherwise, when no activity (data or jam) is input to any of repeater 12's ports, then the AI input is passed downward to BO, while the BI input is passed upward to AO.

When a repeater below repeater 14 has a port receiving an input, then BI to repeater 14 is activated. Repeater 14 passes the activity signal upward, out its AO output to the BI input of repeater 12. Repeater 12 then passes the activity signal upward again, out its AO output to the BI input of repeater 10. Repeater 10 then passes the activity upward to its AO port to any other repeaters above repeater 10 in the chain. The final input and output can be terminated with resistors. All outputs can also be open-collector outputs, while all inputs have pull-up resistors.

Figure 8:
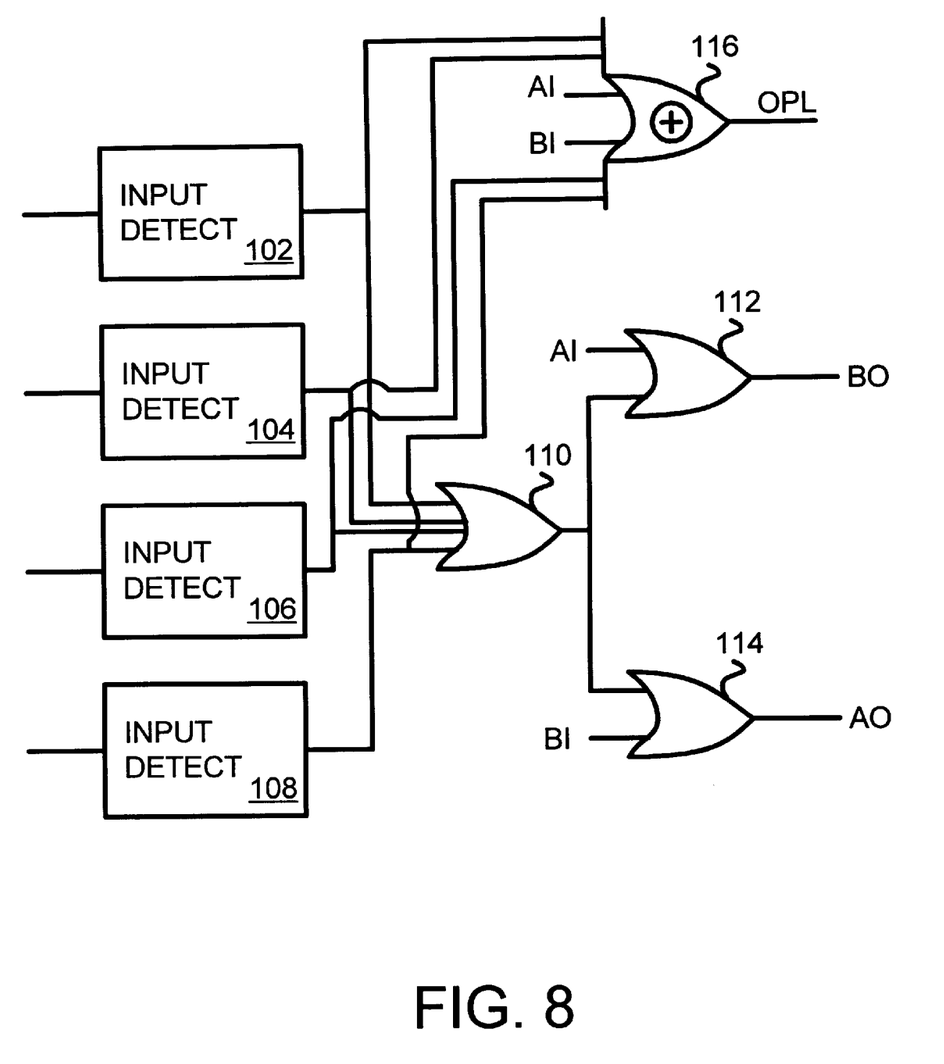
FIG. 8 details a simplified embodiment of activity and one-port-left logic in a stackable repeater.

One-Port-Left Logic—FIG. 8

FIG. 8 details a simplified embodiment of activity and one-port-left logic in a stackable repeater. Input detectors 102, 104, 106, 108 are connected to network ports of the repeater to the computer stations. When the remote computer stations input data to the repeater, input detectors 102, 104, 106, 108 activate their outputs by driving a high voltage. Input detectors can be input-transition detectors that detect ones and zeros, or they can be more complex, capable of decoding the data signals and recognizing the beginning and ending of the data frame.

OR gate 110 receives the outputs from input detectors 102, 104, 106, 108 and pulls its output high when any port is inputting data. This output signals local activity. OR gate 112 receives the AI input from the A activity port and generates the BO output to the B activity port as the logical OR of the local activity from OR gate 110 and the chained activity from upper repeaters input to AI. In a like manner, OR gate 114 receives the BI input from the B activity port and generates the AO output to the A activity port as the logical OR of the local activity from OR gate 110 and the chained activity from lower repeaters input to BI.

Exclusive-OR gate 116 signals the one-port-left state when exactly one of the inputs AI, BI or local activity from input detectors 102, 104, 106, 108 is active.

Collision Propagation With Bi-Directional Chain—FIG. 9

Figure 9A:
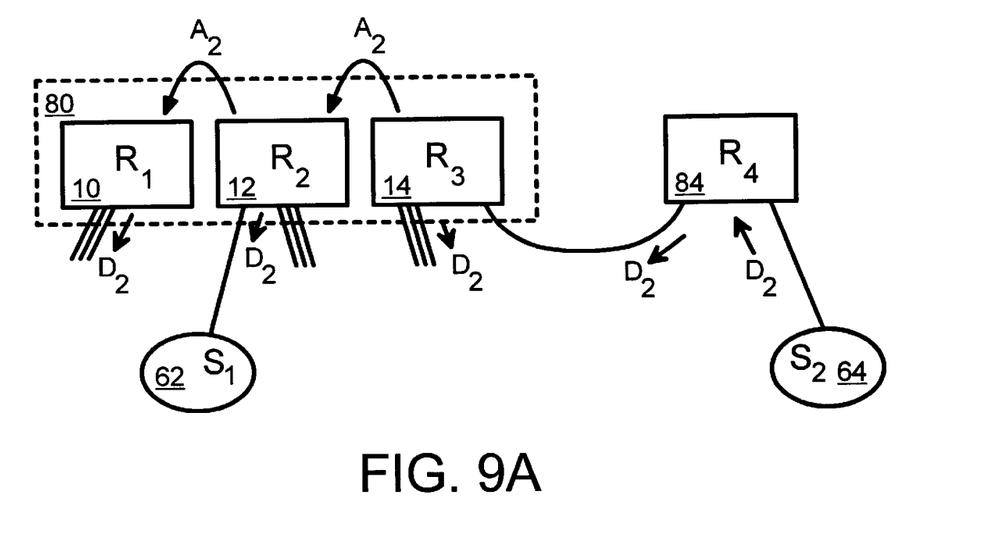
FIGS. 9A–D illustrate operation of the bi-directional daisy chain for detecting and propagating collisions.

FIGS. 9A–D illustrate operation of the bi-directional daisy chain for detecting and propagating collisions. In FIG. 9A, stack module 80 has repeaters 10, 12, 14 stacked together to function as one repeater unit. One of the ports on repeater 14 is connected to repeater 84 through a cable so that repeater 84 is cascaded to repeater 14 in stack module 80. Repeaters 10, 12, 14 are connected together using a stacking bus and bi-directional activity lines as shown in FIGS. 6, 7.

Station 64 on repeater 84 is transmitting data $D_2$ to repeater 84, which is repeated to all other input ports on repeaters 10, 12, 14 through the cascading cable between repeaters 14, 84. Since data $D_2$ is input to a port on repeater 14, repeater 14 generates activity signal $A_2$ on its daisy chain output to repeater 12. Although repeater 12 has no ports inputting data, it passes the activity signal $A_2$ up to repeater 10. Repeater 10 also has no ports inputting data, so it does not generate activity signals down to repeaters 12, 14.

Figure 9B:
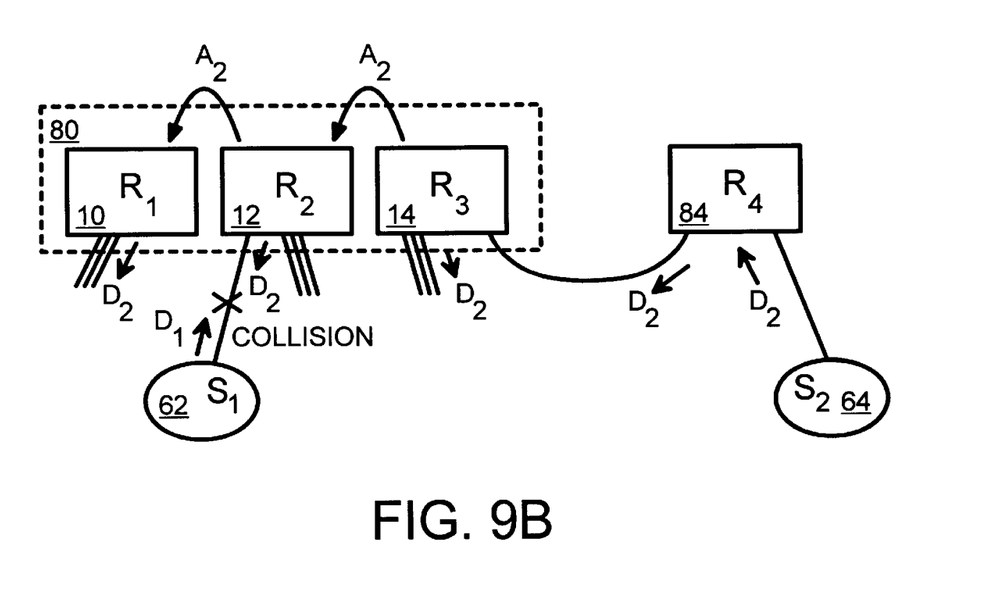

In FIG. 9B, although station 64 is transmitting data $D_2$, station 62 begins transmitting data $D_1$. Perhaps stations 64, 62 begin transmitting at about the same time. A collision occurs on the line between station 62, transmitting $D_1$, and repeater 12, which is repeating $D_2$. Repeater 12 detects this collision by sensing intermediate voltage levels caused by both sides driving the media. Repeater 12 detects this collision since it is transmitting and receiving at the same time.

Figure 9C:
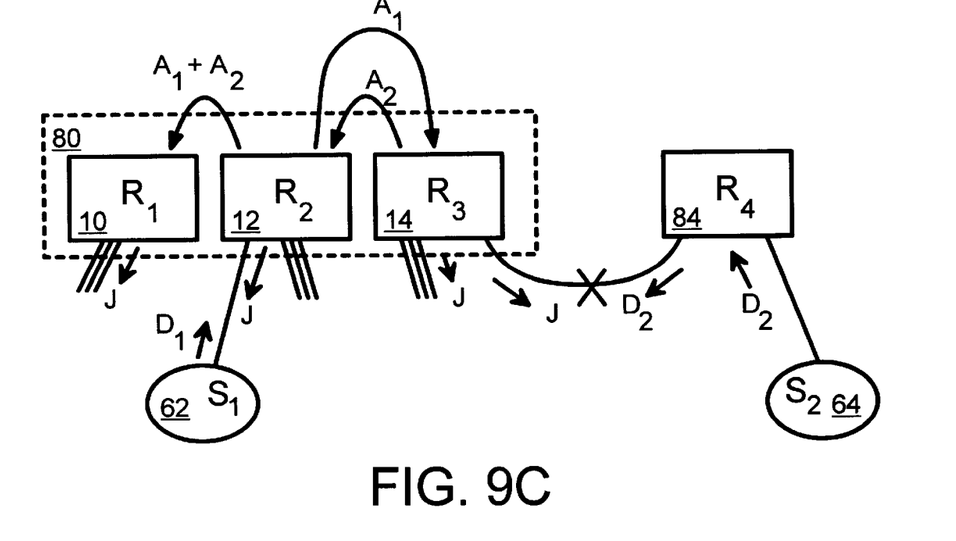

In FIG. 9C, repeater 12 initiates a jam in response to the detected collision by activating the collision COL line (in the stacking bus) to all other repeaters in stack module 80. Repeater 12 also transmits jam sequence J (a pattern of alternating ones and zeros) to all of its ports. The other repeaters 10, 14 in the stack module 80 also generate the jam sequence J to their respective ports. However, repeater 84 is still transmitting data $D_2$ from station 64.

Since repeater 84 is still transmitting data $D_2$ to one of the input ports of repeater 14, repeater 14 continues to generate activity $A_2$ on its activity line upward to repeater 12. Repeater 12 now detects the input from station 62 on one of its input ports, so it generates activity $A_1$ in both directions: back down to repeater 14, and up to repeater 10. Since the bi-directional daisy chain has only a single output line in each direction, the output from repeater 12 up to repeater 10 remains active. It is generated as the logical OR of the incoming daisy-chain signal ($A_2$ generated from repeater 14) and the local activity ($A_1$ from the input port connected to station 62). Thus the daisy-chain signal from repeater 12 upward to repeater 10 is the one-bit result of the logical summation: $A_1+A_2$.

Repeater 10 is in the one-port-left state, since none of its input ports is active, and it sees activity only on one of its daisy-chain inputs, $A_1+A_2$ from repeater 12. Repeater 10 continues to generate the jamming sequence J to all of its ports with the collision line COL active.

Repeaters 12, 14 are not in the one-port-left state, since each sees two active inputs. Repeater 12 sees its port to station 62 active, and also receives activity $A_2$ from repeater 14. Repeater 14 also sees two active inputs: the cascading cable to repeater 84, and the activity $A_1$ from repeater 12.

Figure 9D:
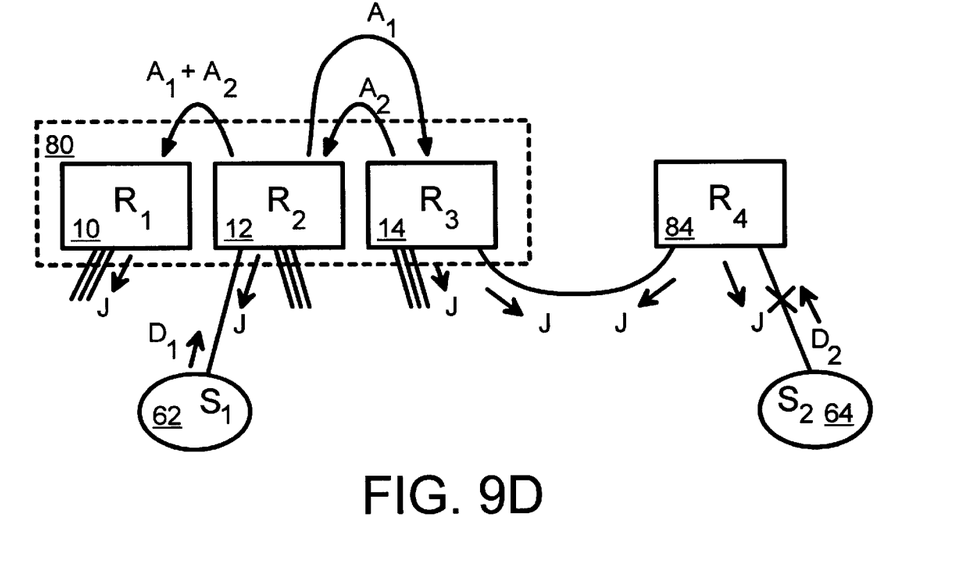

A second collision is generated by repeater 14 on the cable to cascaded repeater 84. This second collision occurs since repeater 14 is transmitting the jam sequence J while repeater 84 is transmitting data $D_2$ from station 64. In FIG. 9D, repeater 84 detects this second collision and activates collision line COL. Repeater 84 also begins transmitting a jamming sequence J to all of its ports, including the port connected to repeater 14 through the cable. A third collision occurs on the media between repeater 84 and station 64. This third collision is detected by station 64, which eventually stops transmitting its data $D_2$.

The bi-directional activity lines within stack module 80 continue active, with repeater 12 originating activity $A_1$ that is sent both upward to repeater 10 and downward to repeater 14 in stack module 80. The activity $A_2$ from the cable between repeater 84 and repeater 14 is generated by repeater 14 and sent upward to repeater 12 and then to repeater 10.

Figure 10A:
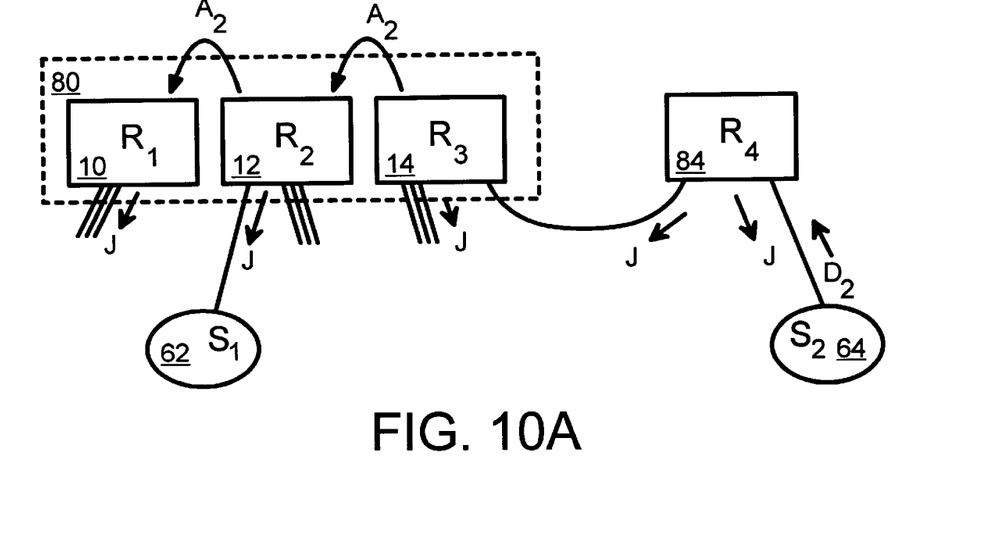
FIGS. 10A–B illustrate operation of the bi-directional daisy chain when a local station backs off first from a collision.
Figure 10B:
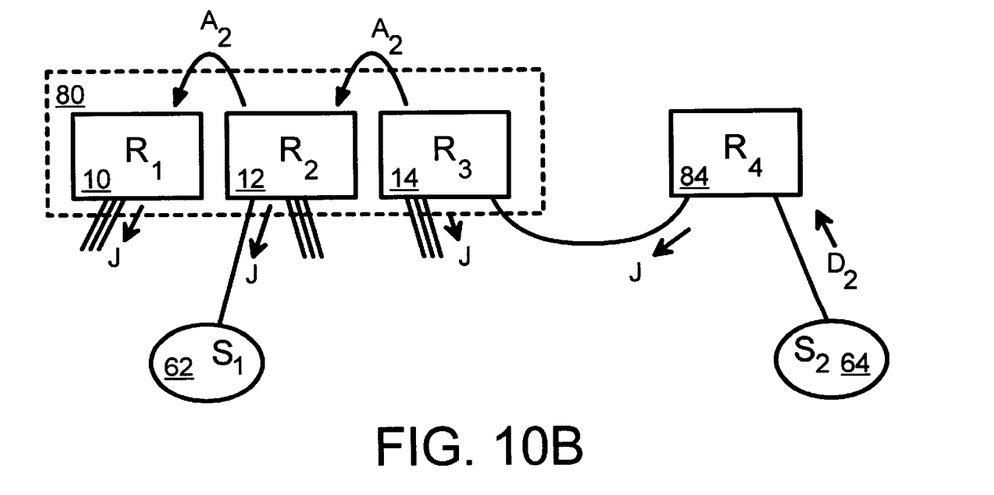

One-Port-Left Detection With Bi-Directional Chain—FIG. 10

FIGS. 10A–B illustrate operation of the bi-directional daisy chain when a local station backs off first from a collision. In FIG. 10A, station 62 detects the collision and backs off by halting transmission of its data $D_1$. This eliminates the first collision between station 62 and jamming sequence J from repeater 12. Repeater 12 no longer detects the collision and stops asserting the collision line COL, which is still being held active by repeater 14. Repeater 12 continues generating the jamming sequence J to station 62 until the collision line COL is deactivated by repeater 14. While the collision line COL is being held active by repeater 14, repeater 12, as well as repeater 10, continue to generate the jamming sequence J to their respective ports. This prevents other stations (not shown) connected to repeaters 10, 12 from making an early access. Repeater 12 no longer detects activity on the input port from station 62, and thus stops generating activity $A_1$ that was sent up to repeater 10 and down to repeater 14. However, activity $A_2$ generated by repeater 14 is still passed up through repeater 12 to repeater 10. At this point, repeater 12 enters the one-port-left state, so both repeaters 10, 12 are in the one-port-left state.

Since repeater 14 no longer receives activity $A_1$ from repeater 12, it has only one active input: the port to repeater 84. Thus repeater 14 also enters the one-port-left state. Repeaters 10, 12, 14 are all now in the one-port-left state. The one-port-left state for repeater 14 differs from those of repeaters 10, 12 since the remaining port left is a local port and not a stacking port. In this one-port-left state, repeater 14 stops generating jamming sequence J to the port connected by the cable to repeater 84. The second collision, on the cable between repeaters 14, 84, now ends. In the meantime, repeater 14 continues to generate jamming sequence J to all its other ports while continuing to activate the collision line COL. With the collision line COL still activated, repeaters 10, 12 continue to generate the jamming sequence J to their respective ports. Repeater 14 stops generating the jamming sequence J to all its other ports and deactivates collision line COL once the input port connected by the cable to cascaded repeater 84 becomes idle.

In FIG. 10B, repeater 84, having only one input port active (the one connected to station 64), enters the one-port-left state. It stops generating the jamming sequence J to station 64 while continuing to generate the jamming sequence J to its other local ports, including the port connected to repeater 14. It waits for station 64 to back off. Station 64 has already detected the collision and responds by halting transmission of $D_2$. The third collision, on the media between station 64 and repeater 84, now also ends. With station 64 finally backing off and ending the collision in repeater 84, repeater 84 stops sending the jamming sequence J to all of its ports.

Repeater 14 no longer observes incoming data from the cable to repeater 84, and stops generating activity $A_2$ to repeater 12. Repeater 12 likewise stops passing activity $A_2$ upward to repeater 10. Repeater 14 deactivates its collision line COL, terminating all jamming from repeaters 10, 12, 14. At this point all ports are idle, waiting for either station 62 or station 64 to end their backoff periods and begin re-transmission. The first station to begin re-transmitting will block the other station. If both stations begin simultaneously, then the backoff periods are increased and the procedure repeated.

Figure 11A:
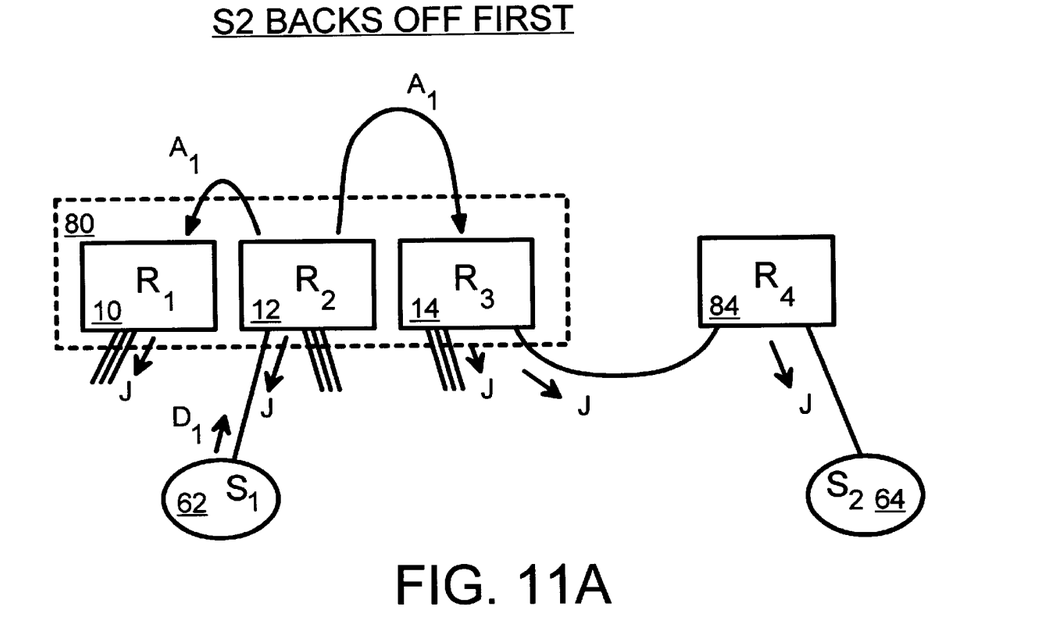
FIGS. 11A–B illustrate operation of the bi-directional daisy chain when a remote station backs off first from a collision.
Figure 11B:
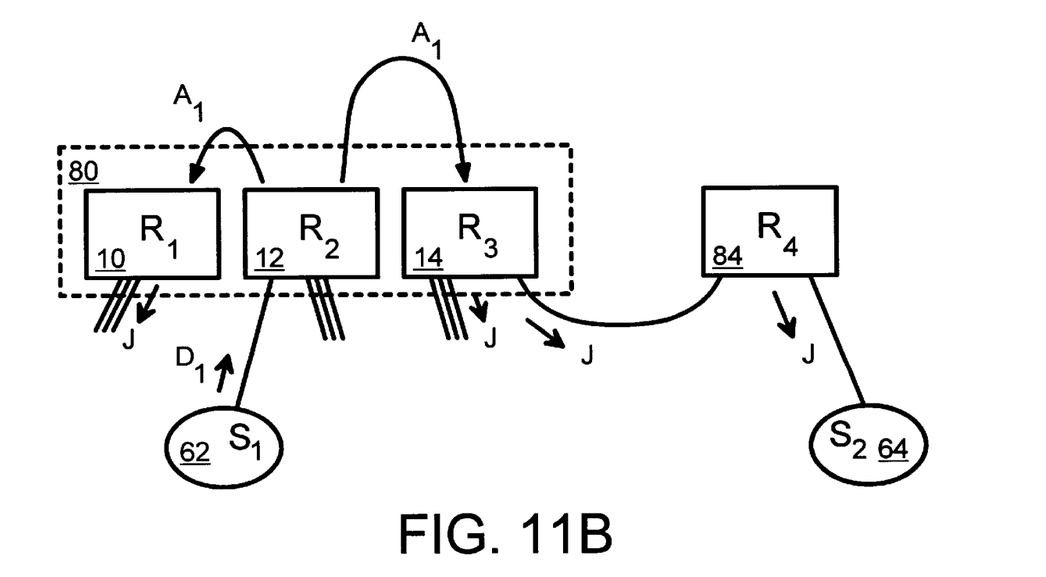

One-Port-Left Detection With Bi-Directional Chain—FIG. 11

FIGS. 11A–B illustrate operation of the bi-directional daisy chain when a remote station backs off first from a collision. In FIG. 11A, station 64 detects the collision and backs off by halting transmission of its data $D_2$. This eliminates the third collision between station 64 and jamming sequence J from repeater 84. Repeater 84, with only one active input port (the one connected by cable to repeater 14) enters the one-port-left state. Repeater 84 stops generating the jamming sequence J to repeater 14 while continuing to generate the jamming sequence to station 64 and all its local ports. Thus the second collision on the cable between repeaters 14, 84 also ends.

Repeater 14 no longer detects input activity on the cable from repeater 84, and thus stops generating activity $A_2$ that was sent up to repeaters 12, 10. However, activity $A_1$ generated by repeater 12 is still passed up to repeater 10 and down to repeater 14. At this point, repeater 14 enters the one-port-left state, so both repeaters 10, 14 are in the one-port-left state.

Since repeater 12 no longer receives activity $A_2$ from repeater 14, it also has only one active input: the port to station 62. Repeater 12 also enters the one-port-left state. It stops transmitting the jamming sequence J to station 62, but not to other ports. The collision line COL is still being driven active by repeater 12 until station 62 backs off. Repeaters 10, 14 continue the jamming sequence J to all their output ports while the collision line COL is active.

In FIG. 11B, station 62, which has previously detected the collision, backs off and responds by halting transmission of $D_1$. The first collision, on the media between station 62 and repeater 12, now also ends. With the end of the collision, repeater 12 de-asserts the collision line COL. De-assertion of the collision line COL halts the jamming sequence J from repeaters 10, 12, 14 to all ports.

Repeater 12 no longer observes incoming data from station 62, and stops generating activity $A_1$ to repeaters 10, 14. All ports are idle, waiting for either station 62 or station 64 to end their backoff periods and begin retransmission.

Figure 12:
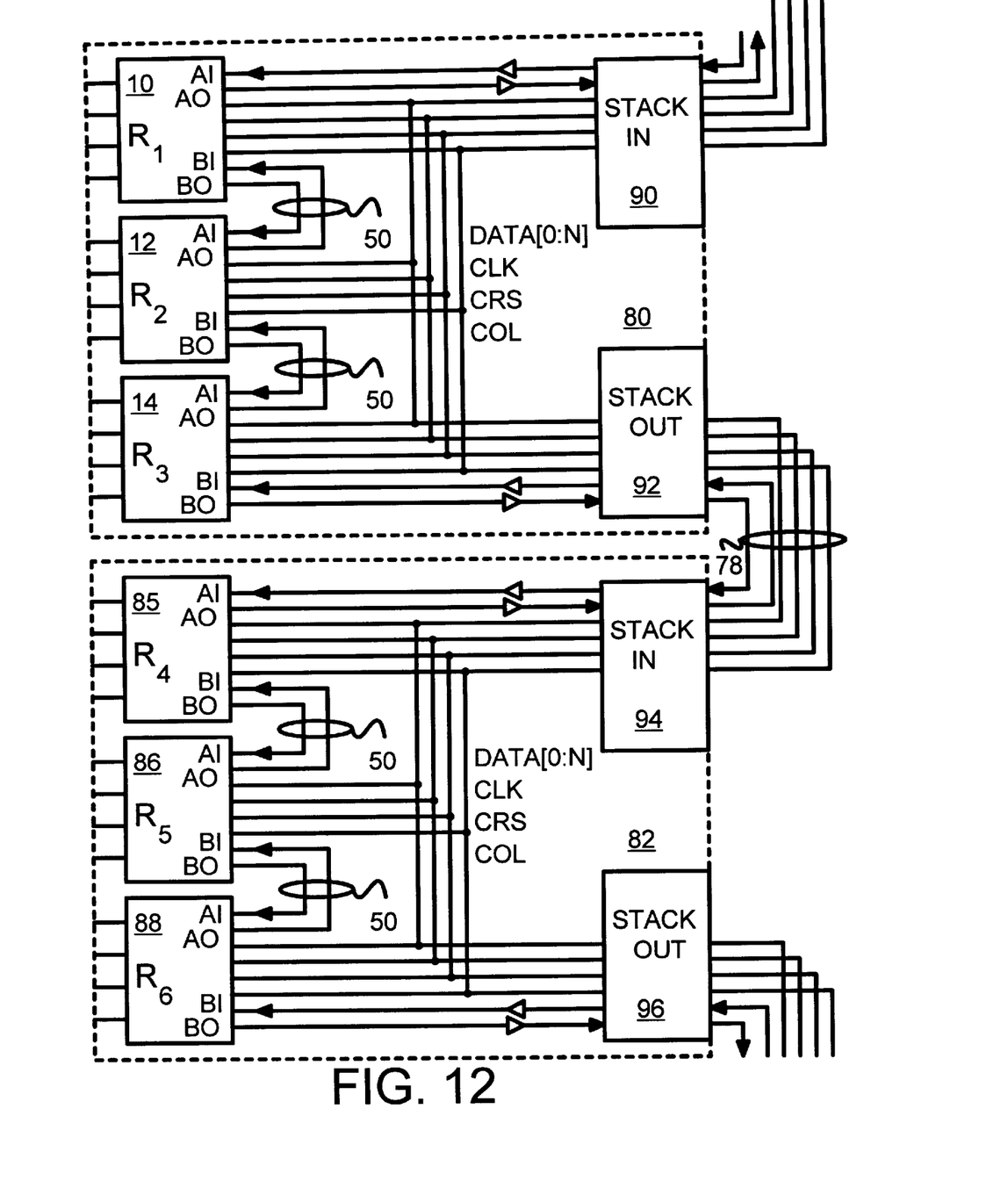
FIG. 12 shows the stacking of repeater modules with activity signals forming a bi-directional daisy chain through the repeaters.

Stacking of Repeater Modules Using Bi-Directional Daisy Chains—FIG. 12

FIG. 12 shows the stacking of repeater modules with activity signals forming a bi-directional daisy chain through the repeaters. Repeaters 10, 12, 14 each have four ports for connecting to computer stations, or for traditional cascading to other repeaters. The data, clock, carrier, and collision signals from repeaters 10, 12, 14 are connected together and buffered (not shown) to stack input connector 90 and to stack output connector 92. These connectors 90, 92 plug into a chassis backplane that includes backplane bus 78 that connects all stack modules 80, 82, etc. Alternately, backplane bus 78 can be a printed circuit board or a conventional cable that connects the stack-in connectors to the stack-out connectors.

Likewise repeaters 85, 86, 88 in stack module 82 each can connect to four computer stations, and have their data, clock, carrier, and collision signals connected together and to stack input connector 94 and stack output connector 96. Backplane bus 78 connects between pairs of stack-in and stack-out connectors 90, 92, 94, 96 to connect all stack modules' signals together.

A bi-directional daisy chain transmits activity information upward and downward through all repeaters in the stack chassis. Two separate chains are formed: one upward, and the other downward. The downward chain begins with a terminator resistor in the chassis, passes through any stack modules above stack module 80, and then enters stack module 80 through stack input connector 90. The chain is buffered and input to the AI input of repeater 10. Repeater 10 OR's in its own activity to that indicated by the chain signal to the AI input and outputs the OR's result as its BO output. The BO output of repeater 10 is chained through activity lines 50 to the AI input of repeater 12. Repeater 12 OR's in its activity and outputs to its BO output. The BO output of repeater 12 is fed to the AI input of repeater 14, which likewise OR's in its local-port activity and outputs to BO.

The BO output of repeater 14 is buffered and sent out of stack module 80 through stack output connector 92, then into stack module 82 through its stack input connector 94. After buffering, the chain continues downward to input AI of repeater 85, out through output BO of repeater 85 to the AI input of repeater 86, next out through output BO of repeater 86 to the AI input of repeater 88 and finally out the BO output of repeater 88 to stack output connector 96. Each repeater 85, 86, 88 logically-OR's the activity from the chain on its AI input with any local activity on its four ports.

The downward chain can continue from stack output connector 96 to the stack input connector of any other stack modules in the chassis below. When stack module 82 is the lowest module, the chain is terminated or simply left open.

The upward chain begins with a terminating resistor at the bottom of the chassis, then goes up through stack output connector 96 to the BI input of repeater 88. Repeater 88 OR's in any local-port activity and outputs the result to its AO output. The AO output of repeater 88 is connected by activity lines 50 to the BI input of repeater 86. The upward chain continues from the AO output of repeater 86 to the BI input of repeater 85, then from the AO output of repeater 85 to stack input connector 94.

The upward chain's signal from stack input connector 94 of stack module 82 is connected by the chassis to stack output connector 92 of the next higher stack module 80. The signal is buffered and input to repeater 14's BI input. Repeater 14 OR's in its local activity, then outputs the result on its AO output, which is connected to the BI input of repeater 12. Repeater 12 OR's its BI input with any local activity, and outputs AO to repeater 10's BI input. Finally, repeater 10 OR's its activity with the BI input and outputs AO to stack input connector 90. The chain can continue upward to other higher stack modules or be left open.

Thus two chains OR in local activity—one chain starting from the top-most repeater and snaking downward through all other repeaters, and the second starting from the bottom-most repeater and snaking upward through all repeaters.

The upward chain's signal at any point indicates if any activity is occurring on the ports of any of the repeaters below the point in the chain. The downward chain's signal at that point indicates if any activity is occurring on the ports of any of the repeaters above the point in the chain. A repeater can quickly determine when it is the only repeater with port activity by examining the two chained signals.

Advantages of the Invention

The bi-directional activity chain allows all repeaters to jam and release the jam at the same time. This allows repeaters in a stack to act as one logical unit and allows fair access of stations using the network.

With the invention, the stack of repeaters is easily expandable. The one-port-left state is detected in a stack of repeaters using digital rather than analog signals. Thus noise sensitivity is reduced. Any number of repeaters can be added to the stack since the inputs to the one-port-left detection logic are not limited. The one-port-left logic is expandable since it is distributed among repeaters rather than in a central location. This allows the repeater units to all be identical.

Installation of the repeaters is facilitated since no special configuration is needed. Stacking can be accomplished using inexpensive cables containing few wires to connect the stack-out of one repeater to the stack-in of the subsequent repeater. The bi-directional activity lines require only two wires.

Alternate Embodiments

Several other embodiments are contemplated by the inventors. For example, the OR'ing logic can be a simple OR gate of the local port activity with the activity-chain input, or more complex logic can be used. Of course, the terms up, upward, upper, lower, etc., are merely for explanation and the physical locations of repeaters in a stack can vary, especially as repeaters are added, removed, or replaced. The local network can include as stations various networking devices such as switches, WAN's, bridges, and gateways to other networks such as the Internet or an organization's Intranet. The two stack connectors to the backplane bus could be combined together into a single connector with two logical parts. Signals can be asserted by either high or low voltage levels.

The data, clock, collision, and carrier signals in the stacking bus can be encoded together to further reduce the number of wires from four to three or two. The bi-directional activity lines do not preclude the passing of data, clock, or other control information.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A stackable repeater for use in a stack of repeaters comprising:

local ports, each local port for connecting to a local station on a network or for cascading to a repeater that is not stacked with the stackable repeater;

an upper activity port for connecting to a next-higher stackable repeater in the stack, the upper activity port having an upper input receiving an upper-activity input signal from the next-higher stackable repeater, the upper activity port also having an upper output for outputting an upper-activity output signal to the next-higher stackable repeater; and a lower activity port for connecting to a next-lower stackable repeater in the stack, the lower activity port having a lower input receiving a lower-activity input signal from the next-lower stackable repeater, the lower activity port also having a lower output for outputting a lower-activity output signal to the next-lower stackable repeater;

a collision line, connected to the stackable repeater, for indicating when any two local ports in the stack of repeaters are both inputting data at a same time;

wherein the upper-activity input signal indicates when any higher repeater above the stackable repeater in the stack has a local port that is inputting data to the higher repeater;

wherein the lower-activity input signal indicates when any lower repeater below the stackable repeater in the stack has a local port that is inputting data to the lower repeater, whereby local-port activity of the higher repeaters in the stack is sent to the stackable repeater through the upper activity port and local-port activity of the lower repeaters in the stack is sent to the stackable repeater through the lower activity port.

2. The stackable repeater of claim 1 wherein the lower-activity output signal indicates when any higher repeater above the stackable repeater in the stack has a local port that is inputting data to the higher repeater or when any local port of the stackable repeater is inputting data to the stackable repeater; and wherein the upper-activity output signal indicates when any lower repeater below the stackable repeater in the stack has a local port that is inputting data to the lower repeater or when any local port of the stackable repeater is inputting data to the stackable repeater, whereby local-port activity of the stackable repeater is OR'ed with the upper-activity input signal to generate the lower-activity output signal and whereby local-port activity of the stackable repeater is OR'ed with the lower-activity input signal to generate the upper-activity output signal.

3. The stackable repeater of claim 2 wherein the lower repeaters are in higher physical locations relative to the stackable repeater and to the higher repeaters.

4. The stackable repeater of claim 2 wherein the lower repeaters are in any physical location relative to the stackable repeater and to any or all of the higher repeaters.

5. The stackable repeater of claim 2 further comprising:

a stackable-bus connection for connecting the local ports to a backplane bus, the backplane bus connected to local ports of other repeaters in the stack, the backplane bus for transferring data input from a local port of a first repeater in the stack to all other repeaters in the stack for output to all local ports.

6. The stackable repeater of claim 5 wherein the backplane bus includes a data line, a clock for clocking data over the data line, a carrier line for framing data sent over the data line, and the collision line for indicating when two local ports are both inputting data at a same time.

7. The stackable repeater of claim 2 wherein the repeaters in the stack are grouped into stack modules, each stack module having at least two stackable repeaters with the upper activity port of one stackable repeater connected to the lower activity port of a second stackable repeater in the stack module;

each stack module having a connector for connecting to other stack modules through a backplane bus, the connector including exactly four activity signals:

(1) an upper-activity input signal to a top-most stackable repeater in the stack module;

(2) an upper-activity output signal from a top-most stackable repeater in the stack module;

(3) a lower-activity input signal to a bottom-most stackable repeater in the stack module;

(4) a lower-activity output signal from a bottom-most stackable repeater in the stack module;

whereby only four activity signals are needed in the connector.

8. The stackable repeater of claim 2 wherein a one-port-left state is signaled in the stackable repeater when none of the local ports are inputting data and either but not both of the lower-activity input signal and the upper-activity input signal indicate local-port activity of the higher or lower repeaters in the stack, wherein the one-port-left state is not signaled when more than one local port on the stackable repeater is active;

whereby the activity signals are used to determine the one-port-left state of the stackable repeater.

9. The stackable repeater of claim 8 wherein the stackable repeater continues asserting a collision signal on the collision line and stops generating a jamming sequence to the active local port of the stackable repeater when the one-port-left state is signaled, the stackable repeater still generating the jamming sequence to other local ports while waiting for the active local port of the stackable repeater to become idle;

wherein the one-port-left state is signaled when one local port is active and no activity ports are active.

10. The stackable repeater of claim 9 wherein the stackable repeater generates the jamming sequence to all local ports of the stackable repeater except the remaining active port of the stackable repeater and asserts a collision signal when the one-port-left state is signaled by the stackable repeater with one active local port on the stackable repeater and with the collision signal asserted.

11. The stackable repeater of claim 10 wherein data inputted to any local port of any repeater in the stack is copied and output to all other local ports of all repeaters in the stack when no collision occurs, whereby the repeaters in the stack act as a single repeater unit.

12. The stackable repeater of claim 1 wherein the stackable repeater is connected by at least one of the local ports to a network that is an Ethernet using a 100BaseT standard.

13. A method for detecting a one-port-left state of a stackable repeater comprising:

reading a first activity signal from a first input from a previous repeater in a stack of repeaters that includes the stackable repeater, the first activity signal indicating when a network port on the previous repeater or on an earlier repeater is receiving input data, the earlier repeater being in a first activity-signal chain input to the previous repeater;

reading a second activity signal from a second input from a following repeater in the stack of repeaters, the second activity signal indicating when a network port on the following repeater or on a later repeater is receiving input data, the later repeater being in a second activity-signal chain input to the following repeater;

activating a local activity signal when any local network port on the stackable repeater is receiving input data; and signaling the one-port-left state when:

(1) the first activity signal but not the second activity signal and not the local activity signal indicates that a port is receiving input data;

(2) the second activity signal but not the first activity signal and not the local activity signal indicates that a port is receiving input data;

(3) the local activity signal but not the first activity signal nor the second activity signal indicates that a port is receiving input data;

wherein the one-port-left state indicates that precisely one local port on the stackable repeater is receiving input data;

whereby the one-port-left state is determined from two external activity signals and an internal activity signal.

14. The method of claim 13 further comprising:

generating a second activity output to the following repeater that indicates when the first activity signal or the local activity signal indicates that a network port is receiving input data; and generating a first activity output to the previous repeater that indicates when the second activity signal or the local activity signal indicates that a network port is receiving input data, whereby activity signals are passed through the stackable repeater to the following repeater and the previous repeater when no local activity is signaled.

15. The method of claim 14 wherein the previous repeater, the following repeater, the earlier repeaters, and the later repeaters each generate a first and a second activity output in a same manner as the stackable repeater, whereby repeaters in the stack have identical one-port-left activity logic.

16. The method of claim 14 further comprising:

detecting a collision on one of the network ports of the stackable repeater;

asserting a collision signal to other repeaters in the stack;

generating a jamming sequence of data and transmitting the jamming sequence to all network ports of the stackable repeaters;

waiting for the network port with the collision to stop receiving data and de-asserting the collision signal and halting generation of the jamming sequence when the collision ends.

17. The method of claim 14 further comprising:

repeating data input from a network port to the stackable repeater to other network ports of the stackable repeater;

copying the data to a backplane bus coupled to other repeaters in the stack;

repeating the data to all network ports of each of the other repeaters in the stack.

* * * * *